(12) United States Patent
Dafonseca et al.

(10) Patent No.: US 11,441,705 B2
(45) Date of Patent: Sep. 13, 2022

(54) SNAP TO GRID BRACKET FOR A SPRINKLER SUPPORT ASSEMBLY

(71) Applicant: ASC Engineered Solutions, LLC, Exeter, NH (US)

(72) Inventors: Odair Dafonseca, Pawtucket, RI (US); Joseph Beagen, North Attleborough, MA (US)

(73) Assignee: ASC Engineered Solutions, LLC, Exeter, NH (US)

( * ) Notice: Subject to any disclaimer, the term of this patent is extended or adjusted under 35 U.S.C. 154(b) by 66 days.

(21) Appl. No.: 16/695,457

(22) Filed: Nov. 26, 2019

(65) Prior Publication Data

US 2020/0096137 A1 Mar. 26, 2020

Related U.S. Application Data

(62) Division of application No. 15/291,204, filed on Oct. 12, 2016, now Pat. No. 10,527,203.

(51) Int. Cl.
*F16L 3/24* (2006.01)
*A62C 35/68* (2006.01)

(52) U.S. Cl.
CPC ............... *F16L 3/24* (2013.01); *A62C 35/68* (2013.01)

(58) Field of Classification Search
CPC . A62C 35/68; F16L 3/24; E04B 9/006; E04B 9/18; E04B 9/20
USPC .............................. 248/230.7, 231.81, 228.7
See application file for complete search history.

(56) References Cited

U.S. PATENT DOCUMENTS

| 2,297,869 | A | 10/1942 | Biller |
| 3,816,880 | A | 6/1974 | Jacobs |
| 4,560,126 | A | 12/1985 | Judkins et al. |
| 4,723,749 | A | 2/1988 | Carraro et al. |
| 4,905,952 | A | 3/1990 | Pinquist |
| 6,260,810 | B1 | 7/2001 | Choi |
| 6,341,466 | B1 * | 1/2002 | Kehoe ..................... F16B 2/241 52/39 |
| 6,554,231 | B2 * | 4/2003 | Choi ....................... E04B 9/006 248/65 |
| 6,752,218 | B2 * | 6/2004 | MacDonald, III ..... A62C 35/68 169/16 |
| 7,152,834 | B2 | 12/2006 | Hsu |
| 7,478,787 | B2 | 1/2009 | Bankston et al. |

(Continued)

OTHER PUBLICATIONS

Dafonseca, Odair; Non-Final Office Action for U.S. Appl. No. 16/687,455, filed Nov. 18, 2019, dated Oct. 6, 2020, 20 pgs.

(Continued)

*Primary Examiner* — Jonathan Liu
*Assistant Examiner* — Guang H Guan
(74) *Attorney, Agent, or Firm* — Taylor English Duma LLP

(57) ABSTRACT

A bracket assembly, a fire sprinkler support assembly, and a method for using a bracket assembly are disclosed. The bracket assembly can comprise a first plate having a first end and a second end, the first plate defining a first plate opening and a first fastener opening; a second plate actionable relative to the first plate and defining a second fastener opening, the second plate extending through the first plate opening in the first plate; and a fastener coupling the first plate to the second plate, wherein the fastener is a screw defining a threaded exterior surface, the screw configured to engage the first fastener opening and the second fastener opening.

9 Claims, 15 Drawing Sheets

(56) References Cited

U.S. PATENT DOCUMENTS

| | | | |
|---|---|---|---|
| 8,413,734 | B2 | 4/2013 | Silcox et al. |
| 8,889,984 | B2 | 11/2014 | Korcz et al. |
| 9,004,421 | B2 | 4/2015 | Feenstra |
| 9,004,422 | B2 | 4/2015 | Feenstra |
| 9,091,051 | B2 | 7/2015 | Baxter et al. |
| 9,526,934 | B2 | 12/2016 | Jung |
| 9,534,622 | B2 | 1/2017 | Jung |
| D782,464 | S * | 3/2017 | Chung .................. D14/253 |
| 9,718,076 | B2 | 8/2017 | Oh |
| 10,173,088 | B2 | 1/2019 | Chong |
| 10,371,290 | B2 | 8/2019 | Dafonseca et al. |
| 10,426,986 | B2 | 10/2019 | Chong |
| 10,527,203 | B2 | 1/2020 | Dafonseca et al. |
| 10,561,873 | B2 * | 2/2020 | Beagen .................. E04B 9/127 |
| 10,619,765 | B2 | 4/2020 | Dafonseca et al. |
| 11,125,359 | B2 | 9/2021 | Beagen et al. |
| 11,320,066 | B2 * | 5/2022 | Dafonseca ................ F16L 3/24 |
| 2015/0377386 | A1 | 12/2015 | Mitchell et al. |
| 2018/0100607 | A1 | 4/2018 | Dafonseca et al. |
| 2020/0080665 | A1 | 3/2020 | Dafonseca et al. |
| 2020/0096137 | A1 * | 3/2020 | Dafonseca ............. A62C 35/68 |
| 2022/0213985 | A1 | 7/2022 | Dafonseca et al. |
| 2022/0213986 | A1 | 7/2022 | Dafonseca et al. |
| 2022/0213987 | A1 | 7/2022 | Dafonseca et al. |

OTHER PUBLICATIONS

Dafonseca, Odair; Final Office Action for U.S. Appl. No. 15/291,204, filed Oct. 12, 2016, dated Feb. 5, 2019, 22 pgs.

Dafonseca, Odair; Non-Final Office Action for U.S. Appl. No. 15/291,204, filed Oct. 12, 2016, dated Mar. 19, 2019, 25 pgs.

Dafonseca, Odair; Non-Final Office Action for U.S. Appl. No. 15/291,204, filed Oct. 12, 2016, dated Jul. 11, 2018, 22 pgs.

Dafonseca, Odair; Notice of Allowance for U.S. Appl. No. 15/291,204, filed Oct. 12, 2016, dated Sep. 12, 2019, 23 pgs.

Dafonseca, Odair; Final Office Action for U.S. Appl. No. 16/687,455, filed Nov. 18, 2019, dated Mar. 4, 2021, 22 pgs.

Dafonseca, Odair; Requirement for Restriction/Election for U.S. Appl. No. 16/687,455, filed Nov. 18, 2019, dated Jun. 15, 2020, 10 pgs.

Dafonseca, Odair; Non-Final Office Action for U.S. Appl. No. 16/687,455, filed Nov. 18, 2019, dated Mar. 23, 2021, 19 pgs.

Dafonseca, Odair; Notice of Allowance for U.S. Appl. No. 16/687,455, filed Nov. 18, 2019, dated Dec. 27, 2021, 12 pgs.

* cited by examiner

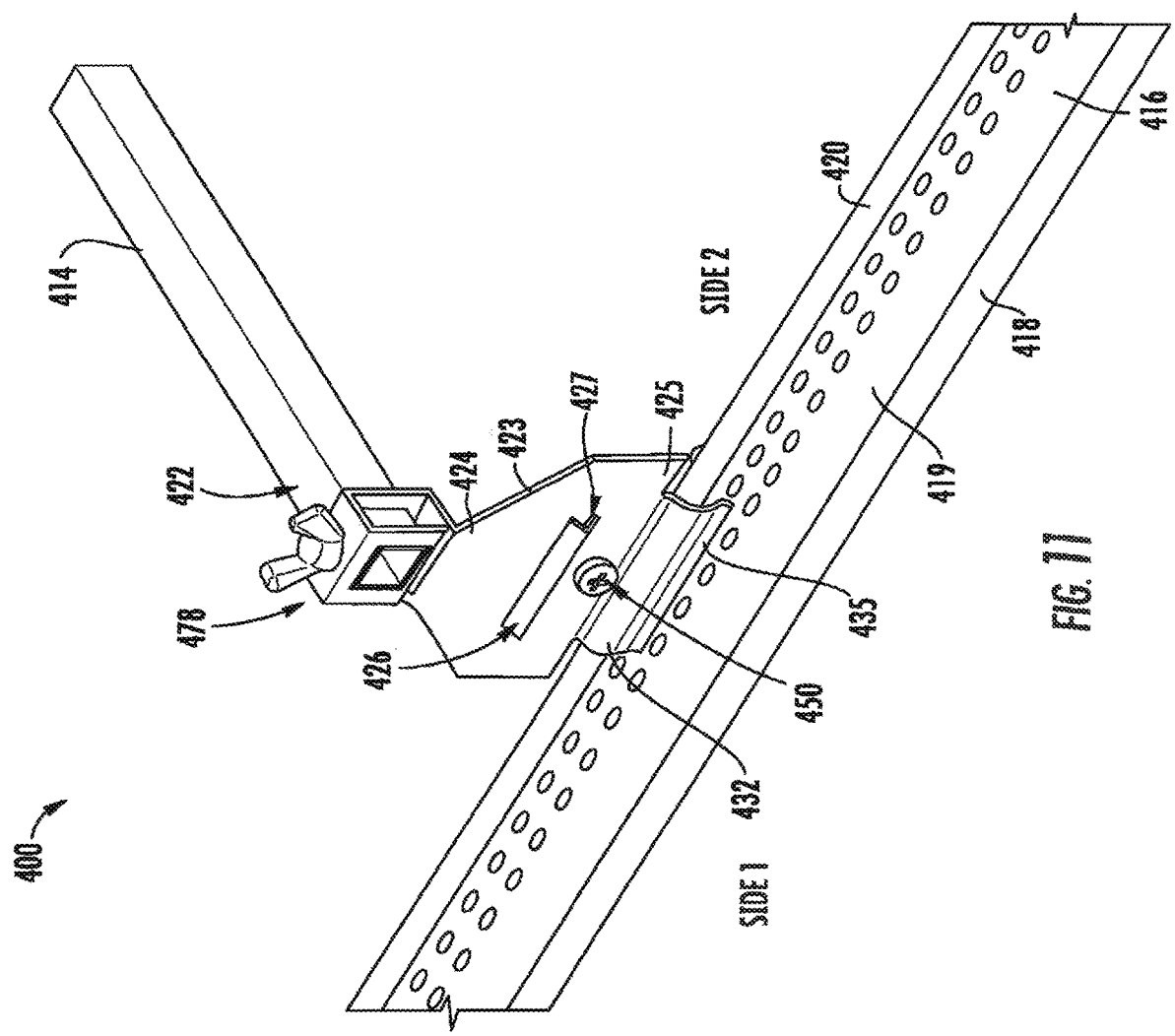

SNAP TO GRID BRACKET FOR A SPRINKLER SUPPORT ASSEMBLY

CROSS-REFERENCE TO RELATED APPLICATIONS

The present application is a divisional of U.S. application Ser. No. 15/291,204, filed Oct. 12, 2016, which is hereby specifically incorporated by reference herein in its entirety.

TECHNICAL FIELD

The present disclosure relates to brackets used in fire protection sprinkler head support systems.

BACKGROUND

A typical automatic fire sprinkler system includes a network of pipes that carry a fire suppression fluid, e.g., water, to one or more rooms in a building. Conduit sections carry the fluid from the pipes to sprinkler heads strategically located in different rooms. The position and orientation of each sprinkler head is typically maintained in place by a support assembly. When the room reaches an elevated temperature due to a fire, the sprinkler head is activated, allowing a stream of fire suppression fluid to be directed over the intended area of coverage. During operation, the fluid pressure at the sprinkler head can reach as high as 175 psi, generating significant back pressure on the sprinkler support system. The support assembly is used to hold the sprinkler securely in place during operation.

Some known sprinkler support assemblies are designed to be secured to a ceiling structure by fasteners such as screws or bolts which must be tightened using special tools in a time consuming process.

SUMMARY

In view of the foregoing, there is a need in the art for a bracket for coupling a fire sprinkler support assembly to a T-bar beam of a ceiling grid system, wherein the bracket is easier to install and meets all fire safety industry requirements.

One approach according to the disclosure includes a fire sprinkler support assembly having a bracket bar configured to extend transverse to a beam, and a bracket assembly coupled to at least one end of the bracket bar. The bracket assembly includes a first plate oriented substantially perpendicular to the bracket bar, the first plate having a first end coupled to the bracket bar and a second end opposite the first end. The bracket assembly further includes a seating frame extending from the second end of the first plate, the seating frame including a first member and a second member disposed on opposite sides of the beam such that the first member and the second member straddle the beam. The bracket assembly further includes a second plate actionable relative to the first plate, the second plate having first and second ends disposed on opposite sides of the beam, and a fastener coupling the first plate with the second plate, wherein the fastener extends through corresponding fastener openings in the first plate and the second plate.

Another approach according to the disclosure includes a fire sprinkler support assembly having a bracket bar configured to extend transverse to a beam, and a bracket assembly coupled to at least one end of the bracket bar. The bracket assembly includes a first plate oriented substantially perpendicular to the bracket bar, wherein the first plate has a first end coupled to the bracket bar and a second end coupled to the beam, and a seating frame extending from the second end of the first plate, wherein the seating frame includes a first member and a second member disposed on opposite sides of the beam such that the first member and the second member straddle the beam. The bracket assembly further includes a second plate rotatable relative to the first plate, wherein the second plate has first and second ends disposed on opposite sides of the beam, and a fastener coupling the first plate with the second plate, wherein the fastener extends through corresponding fastener openings in the first plate and the second plate.

Yet another approach according to the disclosure includes a bracket assembly for coupling a fire sprinkler support assembly to a beam, the bracket assembly having a first plate including a first end coupled to the bracket bar and a second end coupled to the beam, and a seating frame extending from the second end of the first plate, wherein the seating frame includes a first member and a second member disposed on opposite sides of the beam such that the first member and the second member straddle the beam. The bracket assembly further includes a second plate rotatable relative to the first plate, wherein the second plate has first and second ends disposed on opposite sides of the beam, and a fastener coupling the first plate with the second plate, wherein the fastener extends through corresponding fastener openings in the first plate and the second plate.

Also disclosed is a bracket assembly comprising a first plate having a first end and a second end; a second plate rotatable relative to the first plate; and a lever assembly coupling the first plate to the second plate, the lever assembly comprising a lever and a rod, the rod engaging a fastener opening in the first plate and a fastener opening in the second plate.

A method for using a bracket assembly can comprise providing a bracket assembly comprising a first plate, a second plate rotatable relative to the first plate, and a lever assembly, the lever assembly comprising a threaded rod and a lever; engaging a beam with the first plate and second plate; and actuating the lever to decrease the space between the first and second plates to make the bracket assembly more secured with the beam.

A fire sprinkler support assembly is also disclosed, the fire sprinkler support assembly comprising a beam defining a first side and a second side; a bracket bar; and a bracket assembly coupled to at least one end of the bracket bar, the bracket assembly including: a first plate oriented substantially perpendicular to the bracket bar, the first plate having a first end coupled to the bracket bar and a second end coupled to the beam; a second plate rotatable relative to the first plate; and a lever assembly coupling the first plate to the second plate, the lever assembly operable to adjust a distance between the first plate and second plate.

BRIEF DESCRIPTION OF THE DRAWINGS

The accompanying drawings illustrate exemplary approaches of the disclosure, including the practical application of the principles thereof, and in which:

FIG. 11 is a perspective view of a fire sprinkler support assembly according to exemplary approaches of the disclosure;

Figure 1:
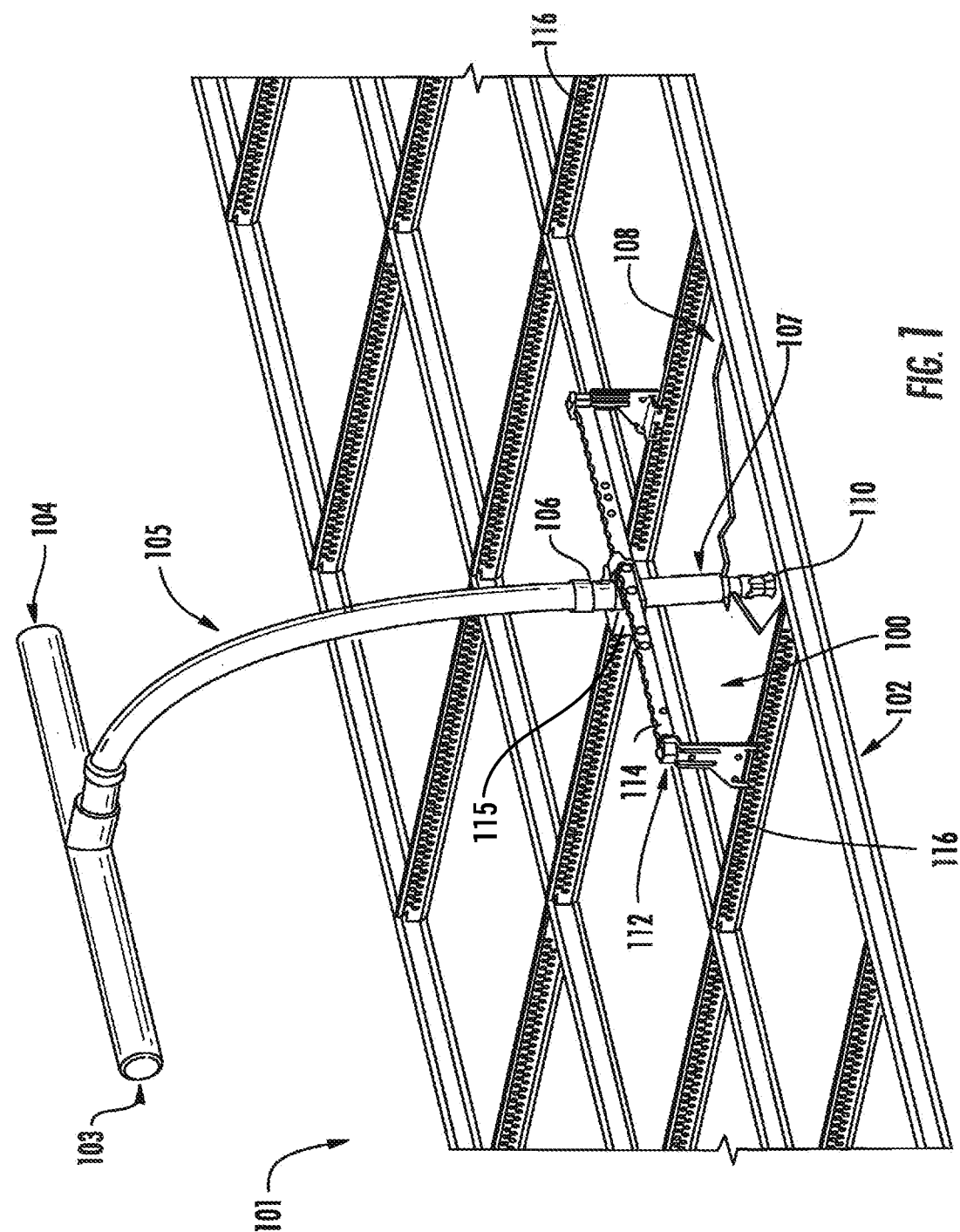
FIG. 1 is a perspective view of a fire sprinkler support assembly mounted within a ceiling according to exemplary approaches of the disclosure.
Figure 2:
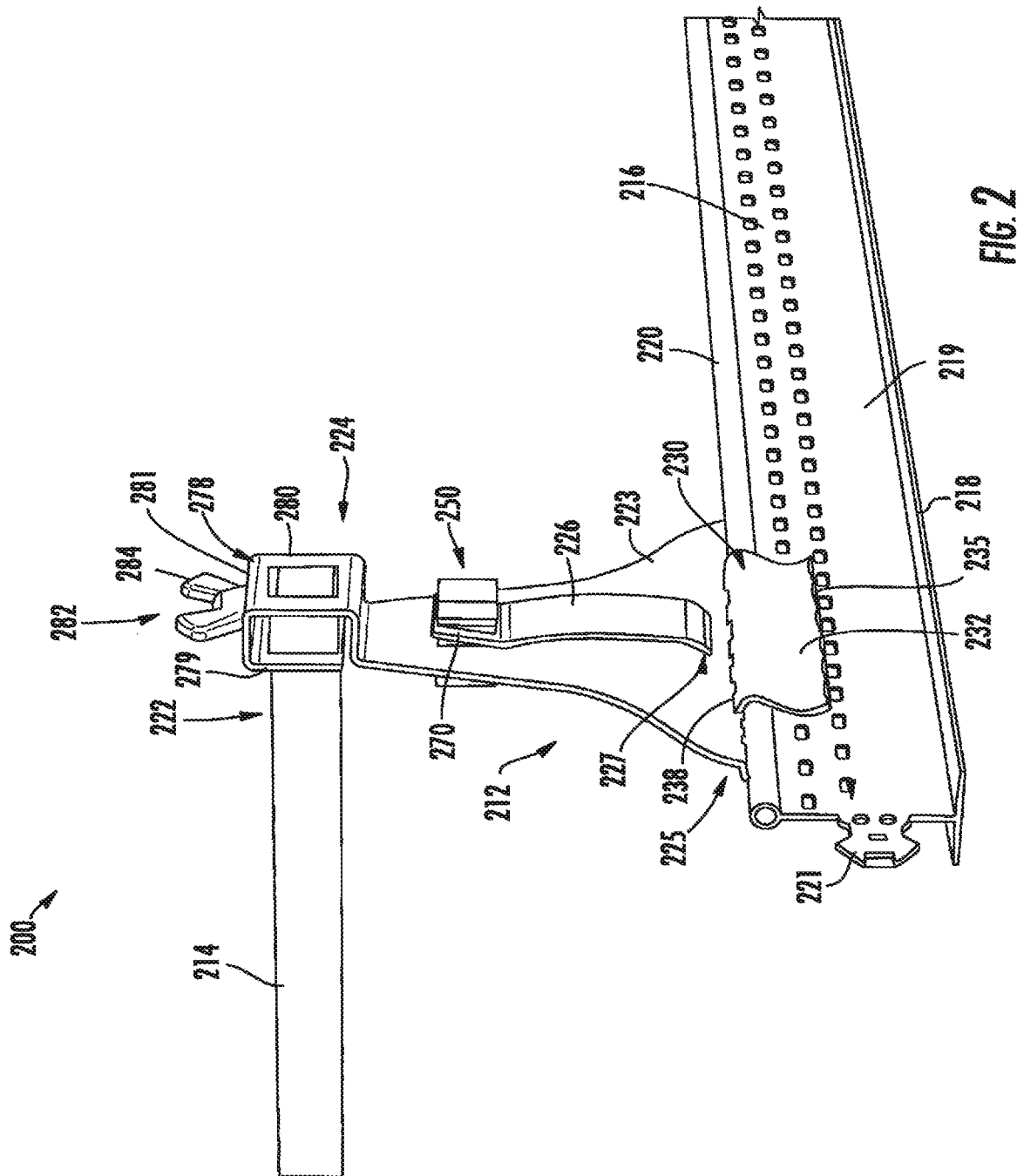
FIG. 2 is a perspective view of a fire sprinkler support assembly according to exemplary approaches of the disclosure.
Figure 3:
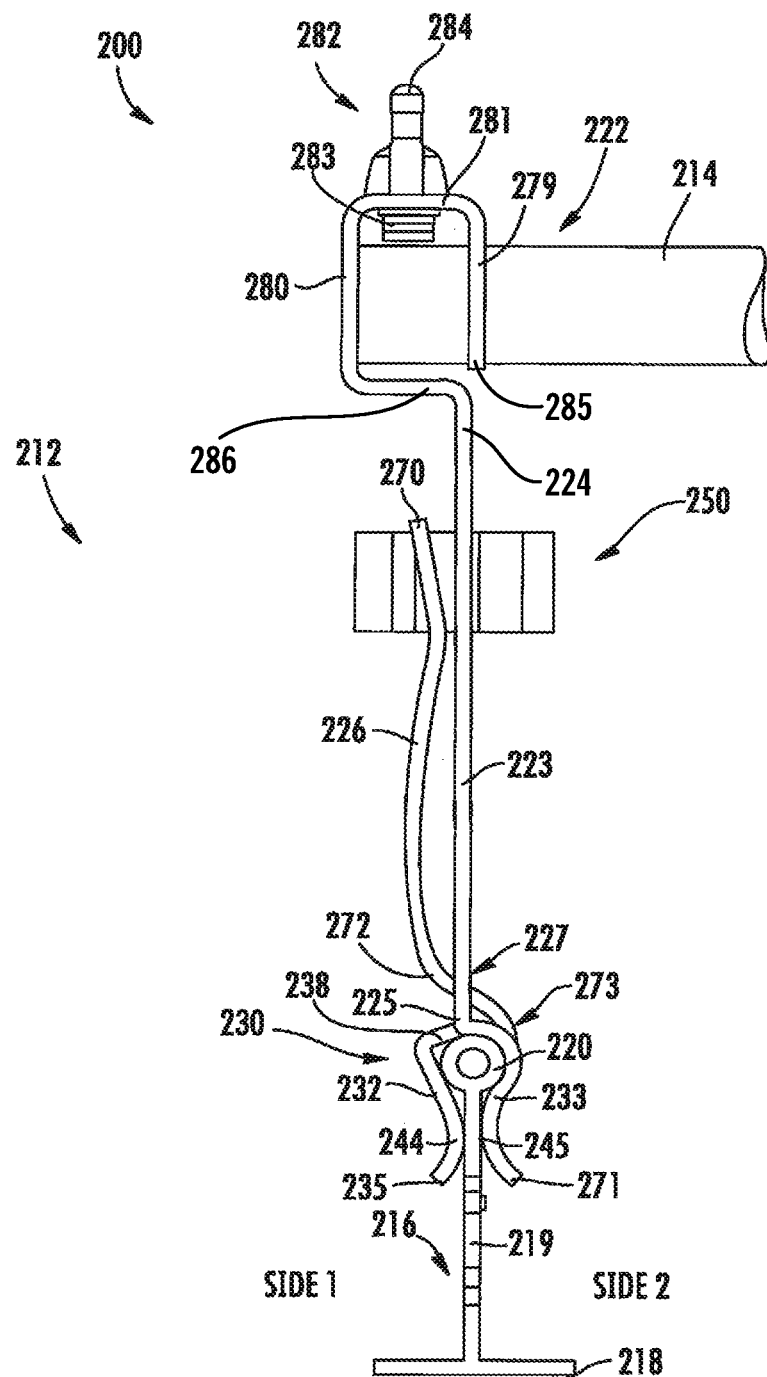
FIG. 3 is a side view of the fire sprinkler support assembly of FIG. 2 according to exemplary approaches of the disclosure.
Figure 4:
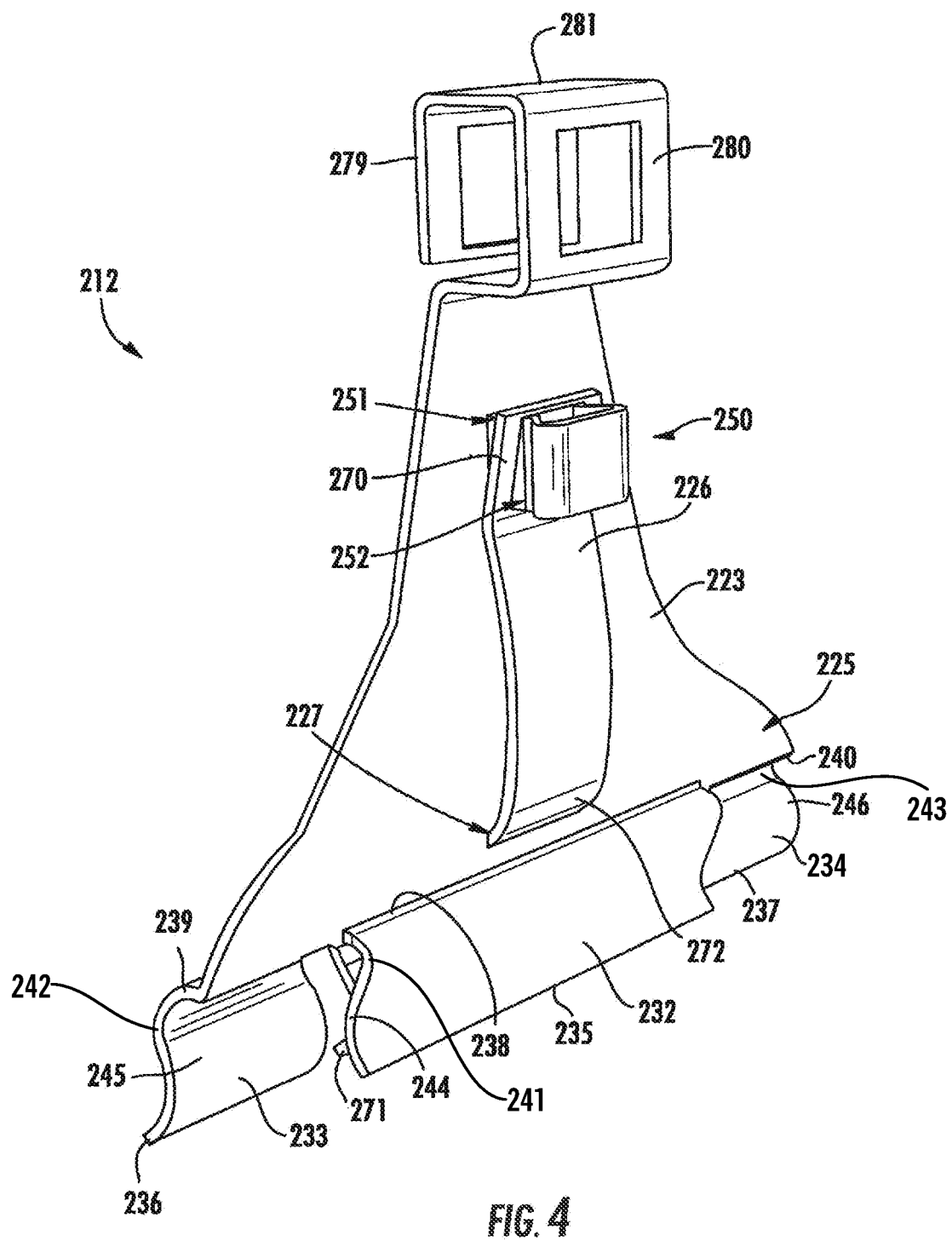
FIG. 4 is a perspective view of the fire sprinkler support assembly of FIG. 2 according to exemplary approaches of the disclosure.
Figure 5:
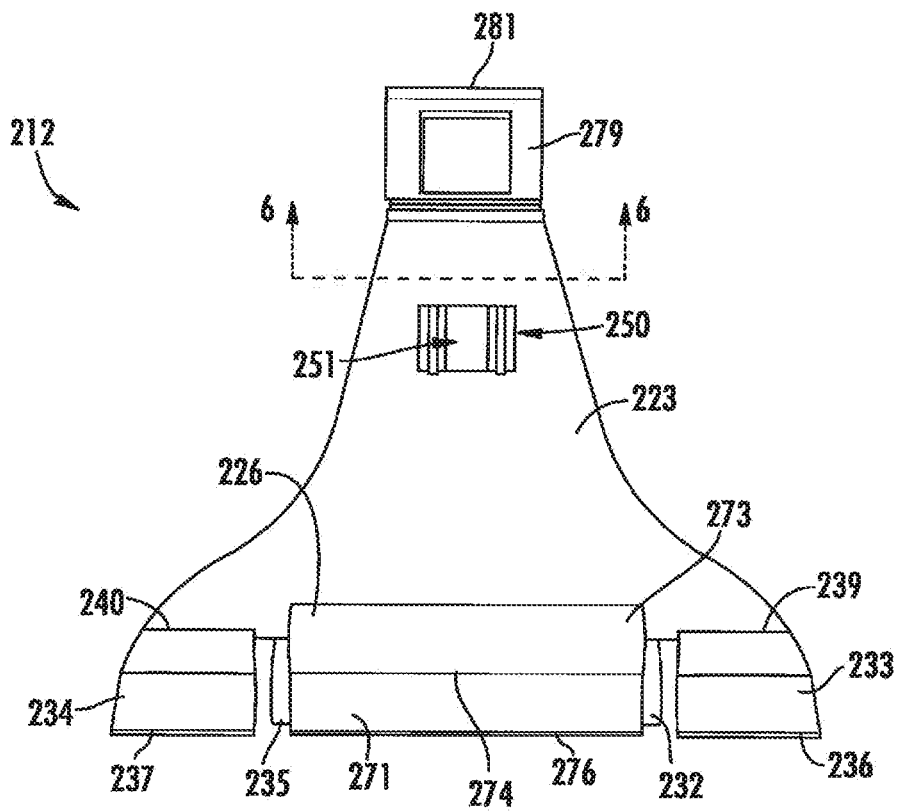
FIG. 5 is a rear view of the fire sprinkler support assembly of FIG. 2 according to exemplary approaches of the disclosure.

The drawings are not necessarily to scale. The drawings are merely representations, not intended to portray specific parameters of the disclosure. Furthermore, the drawings are intended to depict exemplary embodiments of the disclosure, and therefore is not considered as limiting in scope.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

The present disclosure will now proceed with reference to the accompanying drawings, in which various approaches are shown. It will be appreciated, however, that the disclosed torch handle may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

Furthermore, spatially relative terms, such as "beneath," "below," "lower," "central," "above," "upper," and the like, may be used herein for ease of describing one element's relationship to another element(s) as illustrated in the figures. It will be understood that the spatially relative terms may encompass different orientations of the device in use or operation in addition to the orientation depicted in the figures.

As stated above, exemplary approaches herein provide a snap-to-grid bracket or bracket assembly for use with a fire suppression device. In one approach, a support assembly includes a bracket bar extending transverse to a beam, and a bracket assembly coupled to the bracket bar. The bracket assembly may include a first plate oriented substantially perpendicular to the bracket bar, the first plate having a first end coupled to the bracket bar and a second end coupled to the beam. The bracket assembly further includes a seating frame extending from the second end of the first plate, the seating frame including first and second members disposed on opposite sides of the beam such that the first and second members straddle the beam. The bracket assembly further includes a second plate rotatable relative to the first plate, the second plate having first and second ends disposed on opposite sides of the beam, and a fastener coupling together the first and second plates.

Exemplary embodiments of brackets/brackets for fire sprinkler support assemblies described herein may be designed for a T-bar suspended beam of a grid support system. When installing the bracket assembly onto T-bar body, users can "snap" the bracket assembly onto the T-bar beam. Once the bracket assembly is positioned in place, the user can further secure/anchor the bracket assembly to the T-bar beam using the fastener to bias the first and second plates together, which will firmly press the first and second members of the seating frame together on the T-bar beam. To un-anchor the bracket assembly from the T-bar beam, the user may disengage/loosen/release the fastener to unlock the seating frame from the T-bar beam.

FIG. 1 shows a fire sprinkler support assembly (hereinafter "support assembly") 100 mounted within a ceiling 101 having a ceiling frame 102 of rectangular frame sections arranged in a grid pattern. In some embodiments the ceiling frame 102 may be a suspended ceiling. A fire sprinkler system 103 can include supply pipes 104 as part of a fire suppression fluid delivery system. The fire sprinkler system 103 can also include a flexible hose 105, which can couple, via a union nut 106, to the sprinkler drop nipple 107. A ceiling panel 108 may be positioned within a section of the ceiling frame 102, and a sprinkler head 110 may be coupled to a distal end of the sprinkler drop nipple 107, below an opening in the ceiling panel 108. During operation, in the event of a fire, a thermally responsive device of the sprinkler head 110 reacts to heat generated by the fire to allow fluid (e.g., water, nitrogen, and/or halogen) to flow through the sprinkler drop nipple 107 and into the sprinkler head 110, where the fluid is dispersed outwardly to extinguish the fire. In order to protect the room from fire, the support assembly is most commonly located above the ceiling panel 108, but can also reside in a floor or in one or more walls of a building structure.

The support assembly 100 secures the sprinkler head 110 at a predetermined position within an associated one of ceiling panels 108. In order to function effectively, fire sprinkler head 110 must be held firmly in place during operation. Due to the significant back pressure of the fluid flowing therethrough, fire sprinkler head 110 is subjected to significant side, rotational, and torsional forces, which are capable of changing the position of the fire sprinkler head 110, thereby causing the fluid to be directed away from the intended target. The sprinkler support assembly 100 is configured to resist movement of fire sprinkler head 110 by distributing the forces to spaced-apart points along beams 116, which are arranged as a grid.

The support assembly 100 further includes a bracket assembly 112 coupled to at least one end of a bracket bar 114, which in turn is coupled to the flexible hose 105 by a hub connector 115. The bracket assembly 112 connects to each of a pair of adjacent beams 116 of the ceiling frame 102. In one embodiment, each of the beams may be a t-shaped beam suspended from an overlying building structure using, for example, flexible wire, and may be configured according to ASTM International standards. The standards may include, but are not limited to, those set forth in one or more of designations C635, C636 and E580, which are each incorporated herein by reference.

Turning now to FIGS. 2-6, a support assembly according to an embodiment of the disclosure will be described in greater detail. As shown, the support assembly 200 includes a bracket bar 214 configured to extend transverse to a beam 216, which, as shown, may be a t-shaped beam including a flange 218, a web 219 expending perpendicularly from the flange 218, and a rim 220. In some embodiments, the rim 220 may have a hollow circular cross section. The beam 216 may further include a connector 221 for coupling the beam 216 to an adjacent beam (not shown).

The support assembly 200 further includes a bracket assembly 212 coupled to one end 222 of the bracket bar 214. As shown, the bracket assembly 212 may include a first plate 223 oriented perpendicular, or substantially perpendicular, to the bracket bar 214, wherein the first plate 223 has a first end 224 coupled to the bracket bar 214, and a second end 225 opposite the first end 224, coupled to the beam 216. The bracket assembly 212 further includes a second plate 226 actionable relative to the first plate 223, wherein the second plate 226 extends through an opening or slot 227 in the first plate 223. As will be described in greater detail below, the second plate 226 may be biased relative to the first plate 223 to further secure the bracket assembly 212 to the beam 216 once the second end 225 of the first plate 223 is positioned atop the rim 220 of the beam 216.

To better retain the support assembly 200 in place, the bracket assembly may include a seating frame 230 extending from the second end 225 of the first plate 223. As shown, the seating frame 230 may include a first member 232 and a second member 233 disposed on opposite sides of the beam 216 (e.g., sides 1 and 2 shown in FIG. 3) relative to one another such that the first member 232 and the second member 233 straddle the beam 216. The seating frame 230 may further include a third member 234 extending from the second end 225 of the first plate 223, on the same side of the beam 216 as the second member 233. The seating frame 230 provides lateral stability to the support assembly 200 and determines the height of the levered bracket assembly 212 relative to the beam 216. For the sake of reference, as used herein, side 1 of the beam 216 may correspond to an exterior side of the beam 216, whereas side 2 may correspond to an interior side of the beam 216, i.e., a side positioned closer to the hub connector 115 (FIG. 1) along the bracket bar 214.

Each of the first, second, and third members 232-234 include respective free ends 235, 236, and 237, and respective attached ends 238, 239, and 240. As shown, the attached ends 238-240 may be integrally formed with, or coupled to, the second end 225 of the first plate 223. In exemplary embodiments, the attached ends 238-240 include respective curved or bowed sections 241, 242, and 243 extending outwardly away from the beam 216 so as to accommodate the rim 220 of the beam 216 therebetween. The free ends 235-237 may also be curved outwardly from the beam 216 to allow the rim of the beam 216 to be more easily received between the first, second, and third members 232-234 during installation. Central sections 244, 245, and 246 of respective first, second, and third members 232-234 are configured to engage the web 219 of the beam 216 once the seating frame 230 engages the beam 216. During deployment of the sprinkler head 110, the first, second, and third members 232-234 of the seating frame 230 interact with the beam 216 to secure the support assembly 200 to the beam 216 and to maintain the alignment of the sprinkler head 110 by preventing the support assembly 200 from rotating about the bracket assembly 212.

Figure 6:
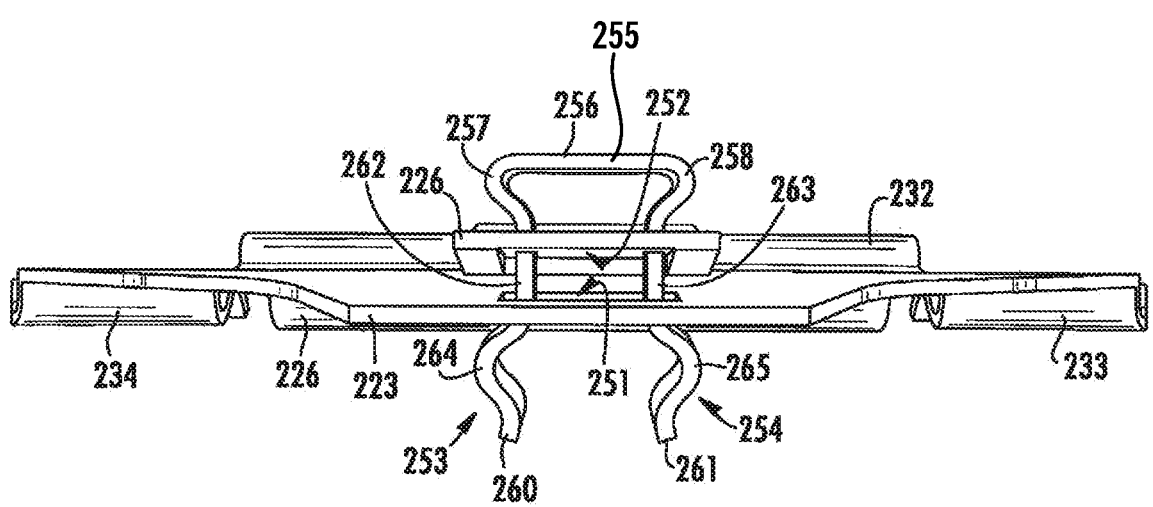
FIG. 6 is a top cutaway view of the fire sprinkler support assembly of FIG. 2 according to exemplary approaches of the disclosure.
Figure 7:
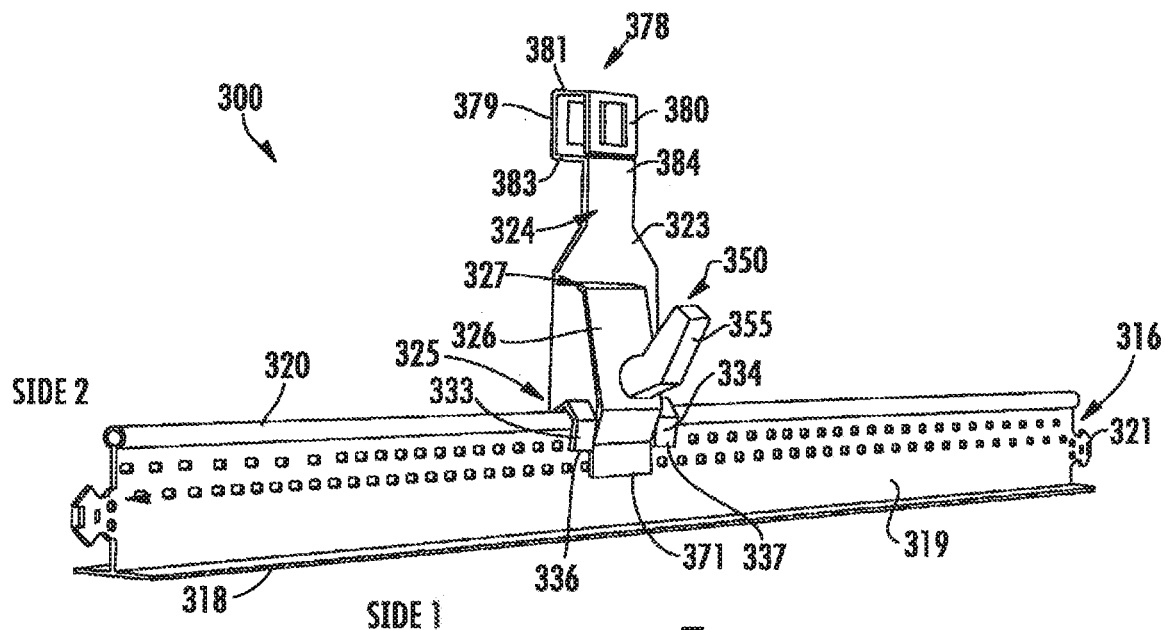
FIG. 7 is a perspective view of a fire sprinkler support assembly according to exemplary approaches of the disclosure.
Figure 8:
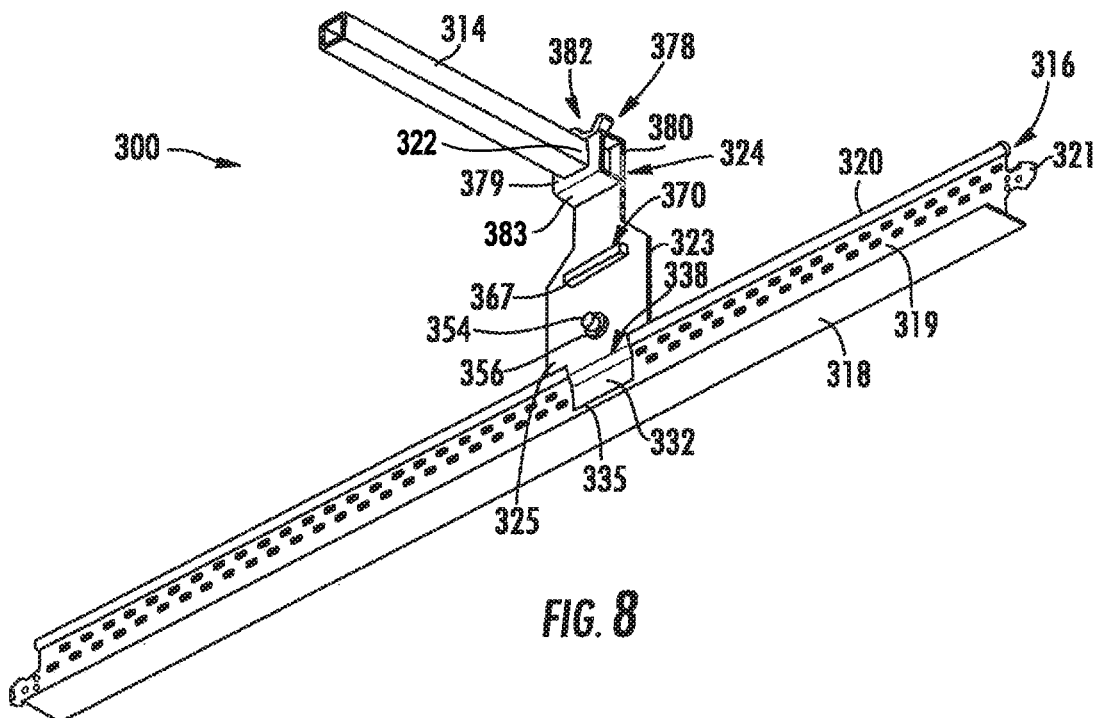
FIG. 8 is a perspective view of the fire sprinkler support assembly of FIG. 7 according to exemplary approaches of the disclosure.
Figure 9:
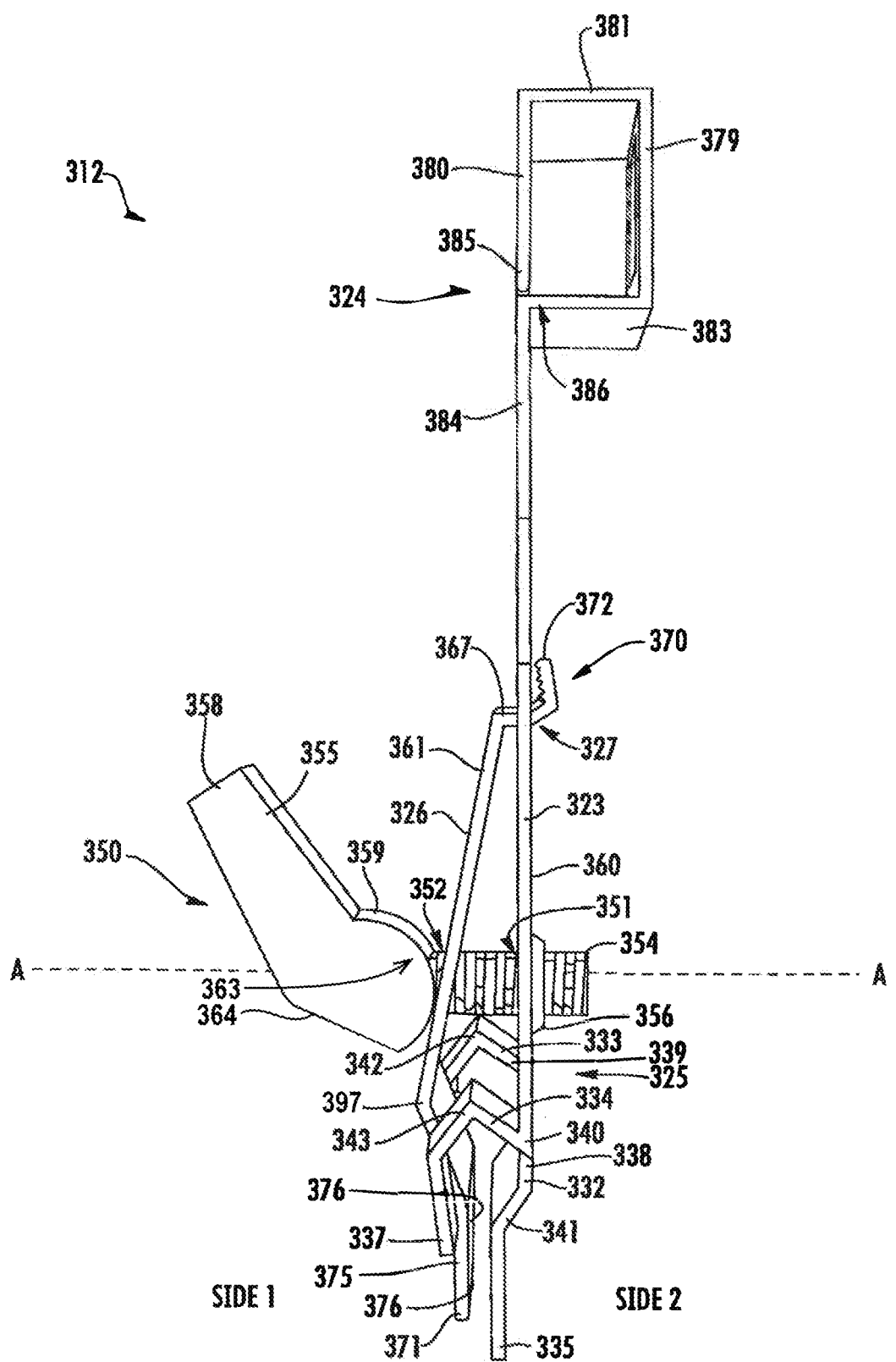
FIG. 9 is a side view of the fire sprinkler support assembly of FIG. 7 according to exemplary approaches of the disclosure.

As further shown, the bracket assembly 212 includes a fastener 250 coupling the first plate 223 with the second plate 226, wherein the fastener 250 extends through corresponding fastener openings 251, 252 in the first plate 223 and the second plate 226, respectively. In exemplary embodiments, the fastener 250 is an anchor push spring lock having a first arm 253 and a second arm 254 connected together by a butt end 255, as best shown in FIG. 6. The first and second arms 253, 254 may be oriented parallel or substantially parallel to one another, while the butt end 255 is arranged perpendicular thereto. The butt end 255 may include a central section 256 and a pair of curved sections 257, 258 extending from opposite ends of the central section 256. As shown, the butt end 255 is generally wider (e.g., as viewed from above) than the opening 252 of the second plate 226. That is, the curved sections 257, 258 extend laterally beyond the edges of the opening 252 in a direction transverse to the bracket bar 214 so as to prevent the butt end 255 from passing through the opening 252 in a direction towards the first plate 223.

The first and second arms 253, 254 may include respective free ends 260 and 261 extending from central members 262 and 263, respectively. The first and second arms 253, 254 further include curved sections 264, 265 disposed opposite one another, wherein the curved sections 264, 265 extend laterally, e.g., in a direction transverse to the bracket bar 214, beyond the edges of the opening 251 of the first plate 223 so as to prevent the free ends 260, 261 from passing through the opening 251 of the first plate 223 once the fastener 250 is place. In one embodiment, the spring force of the fastener 250 causes an outside surface of the curved sections 264, 265 to engage a perimeter defining the opening 251 through the first plate 223 when the bracket assembly 212 is secured to the beam 216.

Referring again to FIGS. 2-6, during installation, the first plate 223 is positioned atop the beam 216, causing the seating frame 230 to straddle the rim 220 and the web 219 of the beam 216, as described above. The second plate 226 may then be actuated, which causes the second plate 226 to move closer to the first plate to further secure the bracket assembly 212 to the beam 216. In exemplary embodiments, the second plate 226 includes a first end 270 and a second end 271, wherein the first and second ends 270, 271 are located on opposite sides of the beam 216 when the seating frame 230 is in place atop the beam 216.

The first end 270 includes opening 252 for receiving the fastener 250 therein. As shown, the second plate 226 extends from the fastener 250, down along the first side of the beam 216, and curves at a first inflection point 272 to pass through the slot 227 in the first plate 223. The second plate 226 may further include a second inflection point 273 on the second side of the beam 216, wherein an inner surface of the beam 216 proximate the second inflection point 273 generally conforms to the curvature of the rim 220. The second plate 226 may further include a third inflection point 274, wherein the inner surface of the second plate 226 proximate the third inflection point 274 makes physical contact with the web 219 of the beam 216. In some embodiments, a tip 276 of the second plate may curve outwardly away from the beam 216 to allow the rim 220 of the beam 216 to pass more easily into the seating frame 230 during engagement.

In exemplary embodiments, the bracket assembly 212 is coupled to the bracket bar 214 at the first end 224 of the first plate 223 by a hanger member 278. As shown, the hanger member 278 includes a pair of parallel, or substantially parallel, side walls 279, 280 connected by a top wall 281. The pair of side walls 279, 280 may be oriented transverse to the bracket bar 214, and parallel, or substantially parallel, to the remainder of the first plate 223. In exemplary embodiments, the bracket bar 214 extends through each of the side walls 279, 280, and is secured in place by a fastener 282, such as a bolt 283 and wingnut 284. The hanger member 278 may include a free end 285 and a secured end 286, which is integrally formed with the first end 224 of the first plate 223. In other embodiments, the free end 285 may be integrally formed or coupled to the first end 224 of the first plate 223 so that a contiguous frame is formed.

Although not shown, in some embodiments, the first and/or second plates 223, 226 may include stiffening ridges extending between respective first and second ends 224, 225 and 270, 271. Alternatively, the first and/or second plates 223, 226 can be configured to have sufficient thickness to resist flexion when the bracket assembly 212 is secured to the beam 216.

Furthermore, although the first and second plates 223, 226 are disclosed in this embodiment as being two separate members, it will be appreciated that the bracket assembly 212 is not limited to this configuration. For example, in an alternative embodiment (not shown), the second plate 226 may be formed as a partial cut out portion of the first plate 223 that is folded back over a portion of the first plate 223. Instead of being hinged or coupled to the first plate 223 as described above, the second plate 226 may extends integrally from the first plate 223 and can rotate relative to the first plate 223 about an attached edge due to the flexibility of the material from which the plates are fabricated.

Turning now to FIGS. 7-10B, a support assembly according to another embodiment of the disclosure will be described in greater detail. As shown, the support assembly 300 includes a bracket bar 314 configured to extend transverse to a beam 316, which, as shown, may be a t-shaped beam including a flange 318, a web 319 expending perpendicularly from the flange 318, and a rim 320. In some embodiments, the rim 320 may have a hollow circular cross section. The beam 316 may further include a connector 321 for coupling the beam 316 to an adjacent beam (not shown).

The support assembly 300 further includes a bracket assembly 312 coupled at one end 322 of the bracket bar 314. As shown, the bracket assembly 312 may include a first plate 323 oriented perpendicular, or substantially perpendicular, to the bracket bar 314, wherein the first plate 323 has a first end 324 coupled to the bracket bar 314, and a second end 325 opposite the first end 224, coupled to the beam 316. The bracket assembly 312 further includes a second plate 326 actionable relative to the first plate 323, wherein the second plate 326 extends through an opening or slot 327 in the first plate 323. As will be described in greater detail below, the second plate 326 may be biased relative to the first plate 323 to further secure the bracket assembly 312 to the beam 316 once the second end 325 of the first plate 323 is positioned atop the rim 320 of the beam 316.

The bracket assembly may further include a seating frame 330 extending from the second end 325 of the first plate 323. As shown, the seating frame 330 may include a first member 332 and a second member 333 disposed on opposite sides of the beam 316 (e.g., sides 1 and 2 shown in FIG. 7) relative to one another such that the first member 332 and the second member 333 straddle the beam 316. The seating frame 330 may further include a third member 334 extending from the second end 325 of the first plate 323, on the same side of the beam 316 as the second member 333. Each of the first, second, and third members 332-334 include respective free ends 335, 336, and 337, and respective attached ends 338, 339, and 340. As shown, the attached ends 338-340 may be integrally formed with, or coupled to, the second end 325 of the first plate 323. In exemplary embodiments, the attached ends 338-340 include respective curved or bent sections 341, 342, and 343 generally shaped to accommodate the rim 320 of the beam 316 therebetween. The free ends 335-337 may be straight, as shown, or may alternatively be curved outwardly from the beam 316 to allow the rim of the beam 316 to be more easily received between the first, second, and third members 332-334 during installation.

As further shown, the bracket assembly 312 includes a fastener 350 coupling the first plate 323 with the second plate 326, wherein the fastener 350 extends through corresponding fastener openings 351, 352 in the first plate 323 and the second plate 326, respectively. In exemplary embodiments, the fastener 350 is a lever assembly including a rod 354 connected to a lever 355, wherein the rod 354 is oriented perpendicularly, or generally perpendicularly, to the first plate 323. The rod 354 may be a threaded bolt or stud, which passes through the corresponding fastener openings 351, 352 in the first plate 323, and is secured by a nut 356. The threads of the rod 354 are configured to engage the nut 356, which is positioned in abutment with an interior surface 360 of the first plate 323. By rotating the threaded rod 354, the amount of space between the plates 323, 326 can be adjusted to make the bracket assembly 312 more secure about the beam 316.

The lever 355 is connected to one end of the rod 354, and includes a free end 358 and a cam surface 359. As shown, the cam surface 359 is engaged with the second plate 326, and the free end 358 of the lever 355 is actionable relative to the second plate 326 to reduce or increase tension between the first and second plates 323, 326. The lever 355 may be pivotally connected to the end of the rod 354 by a pin (not shown) and the rotational axis of the lever 355 is eccentric relative to the periphery of the cam surface 359. The cam surface 359 of the lever 355 has a generally semi-circular peripheral shape. When the bracket assembly 312 is assembled, the cam surface 359 abuts an outward-facing surface 361 of the second plate 326. The lever 355 rotates about the pin between an open position and a closed position, to increase and decrease the tension/distance between the first and second plates 323, 326.

More specifically, when the lever 355 is actuated, the cam surface 359 rotates about the eccentric rotational axis and creates a camming action against the second plate 326. The camming action is facilitated by the shape of the cam surface 359, which includes a first section 363, which is generally semi-circular, and a second section 364, which is generally flat. The flat shape of the second section 364 enables that the lever 355 to be freely movable and adjustable when the bracket assembly 312 is in the open position. As the free end 358 of the lever 355 is actuated upwards and towards the first end 324 of the first plate 323, the first section 363 gradually pulls the rod 354 toward the second plate 326 along the axis A (FIG. 9), which is perpendicular, or substantially perpendicular, to the first plate 323. The first section 363 simultaneously pushes the second plate 326 towards the first plate 323 along the axis A, thereby increasing tension and reducing the spacing between the first and second plates 323, 326.

The first end 370 of the second plate 326 has a lateral member 367, which extends through the opening 327 of the first plate 323, and a tip end 372, which extends upwards and is angled towards the interior surface 360 of the first plate 323. In some embodiments, the lateral member 367 is oriented perpendicular, or substantially perpendicular, to the first plate 323 as it extends through the opening 327. The tip end 372 may pivot or rotate to increase the distance between the tip end 372 and the interior surface 360 when the lever 355 is in open position, and to decrease the distance between the tip end 372 and the interior surface 360 when the lever 355 is in a closed position. It will be appreciated that the first end 370 is dimensioned with sufficient clearance relative to the opening 327 through the first plate 323 to allow for rotation therebetween as the fastener 350 moves between open and closed positions.

As further shown, the second plate 326 extends from its connection point with the first plate 323, down along side 1 of the beam 316 at an angle away from the beam 316. At a first inflection point 397, the second plate 326 angles towards the beam 316, the first inflection point 397 shaped to allow for the curvature of the rim 320. The second plate 326 may further include a flat lower section 375 having an inner surface 376 configured to make physical contact with the web 319 of the beam 316. The second end 371 of the second plate 326 may extend downward, substantially parallel to the first plate 323, or may curve outwardly away from the beam 316 to allow the rim of the beam 316 to pass more easily into the seating frame 330 during installation.

In exemplary embodiments, the bracket assembly 312 is coupled to the bracket bar 314 at the first end 324 of the first plate 323 by a hanger member 378. As shown, the hanger member 378 includes a pair of parallel, or substantially parallel, walls 379, 380 connected by a top wall 381. A bottom wall 383 of the hanger member 378 connects the side wall 379 to a neck 384 of the first plate 323. The parallel walls 379, 380 may be oriented transverse to the bracket bar 314, and parallel or substantially parallel to the remainder of the first plate 323. In exemplary embodiments, the bracket bar 314 extends through each of the first and second parallel walls 379, 380, and is secured in place by a fastener 382, such as a bolt and wingnut. The hanger member 378 may include a free end 385 and a secured end 386, which is integrally formed with the first end 324 of the first plate 323. In other embodiments, the free end 385 may be integrally formed or coupled to the remainder of the first plate 323 so that no gap is present therebetween. As shown, the hanger member 378 may have a rectangular, or substantially rectangular, shape to accommodate the shape of the bracket bar 314.

Figure 10A:
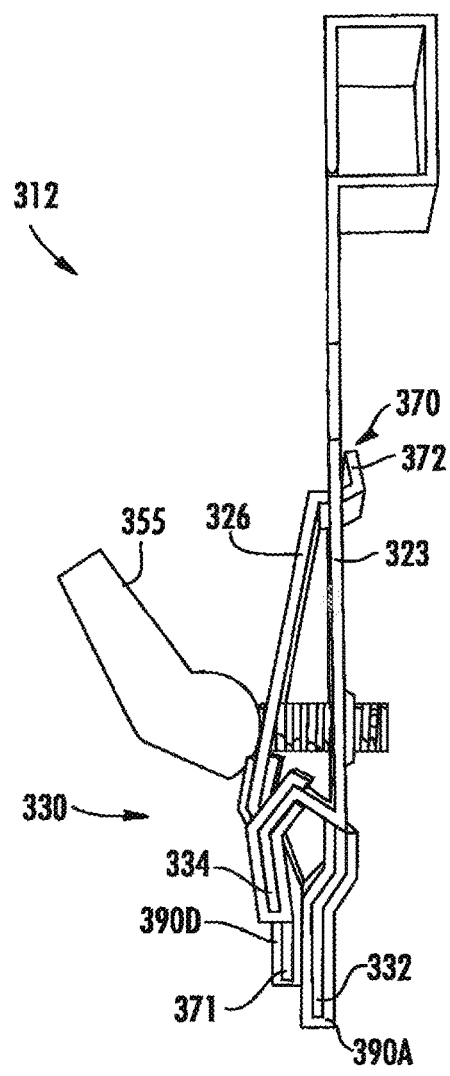
FIG. 10A is a side view of the fire sprinkler support assembly of FIG. 7 including a barrier layer according to exemplary approaches of the disclosure.
Figure 10B:
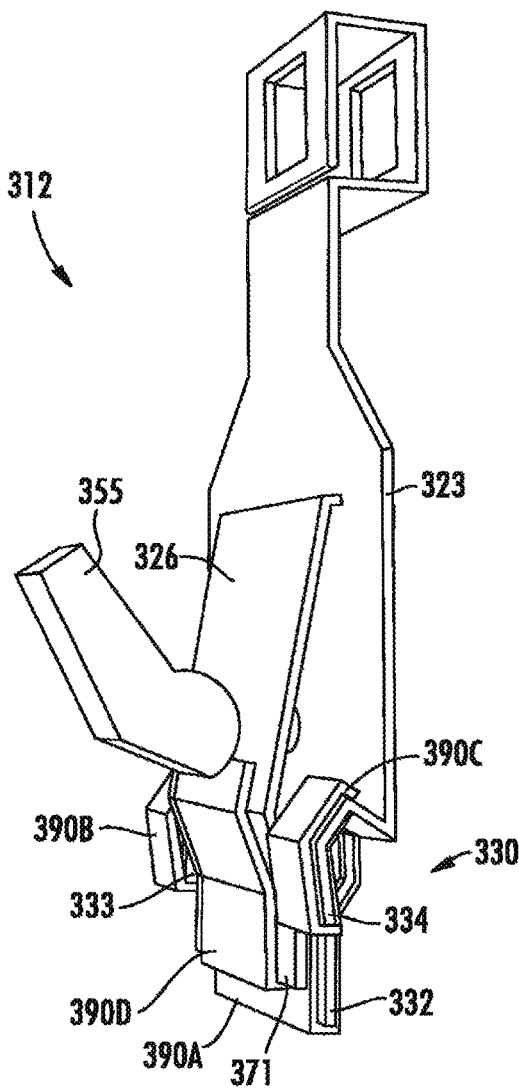
FIG. 10B is a perspective view of the fire sprinkler support assembly of FIG. 7 including a barrier layer according to exemplary approaches of the disclosure.

As shown in FIGS. 10A-B, the bracket assembly 312 may include a barrier layer provided along one or more surfaces of the seating frame 330. In one embodiment, the barrier layer includes a set of plastic inserts 390A-D formed along respective inner and outer surfaces of the first, second, and third members 332, 333, and 334, as well as along inner and outer surfaces of the second end 371 of the second plate 326. As shown, the inserts 390A-D are open at a top thereof, and extend around the bottom edges of the components of the seating frame 330. The inserts 390A-D may increase durability and reduce friction between the seating frame 330 and the beam 316 during installation. Furthermore, in some embodiments, the plastic inserts 390A-D may be useful for low-voltage suspended ceiling power distribution systems in which screws on the ceiling grids should not be used. It will be appreciated that although the barrier layer is described with connection to the seating frame 330 of the embodiments shown in FIGS. 7-10, a similar barrier layer may be formed along other seating frame arrangements provided in the various embodiments disclosed herein.

Figure 12:
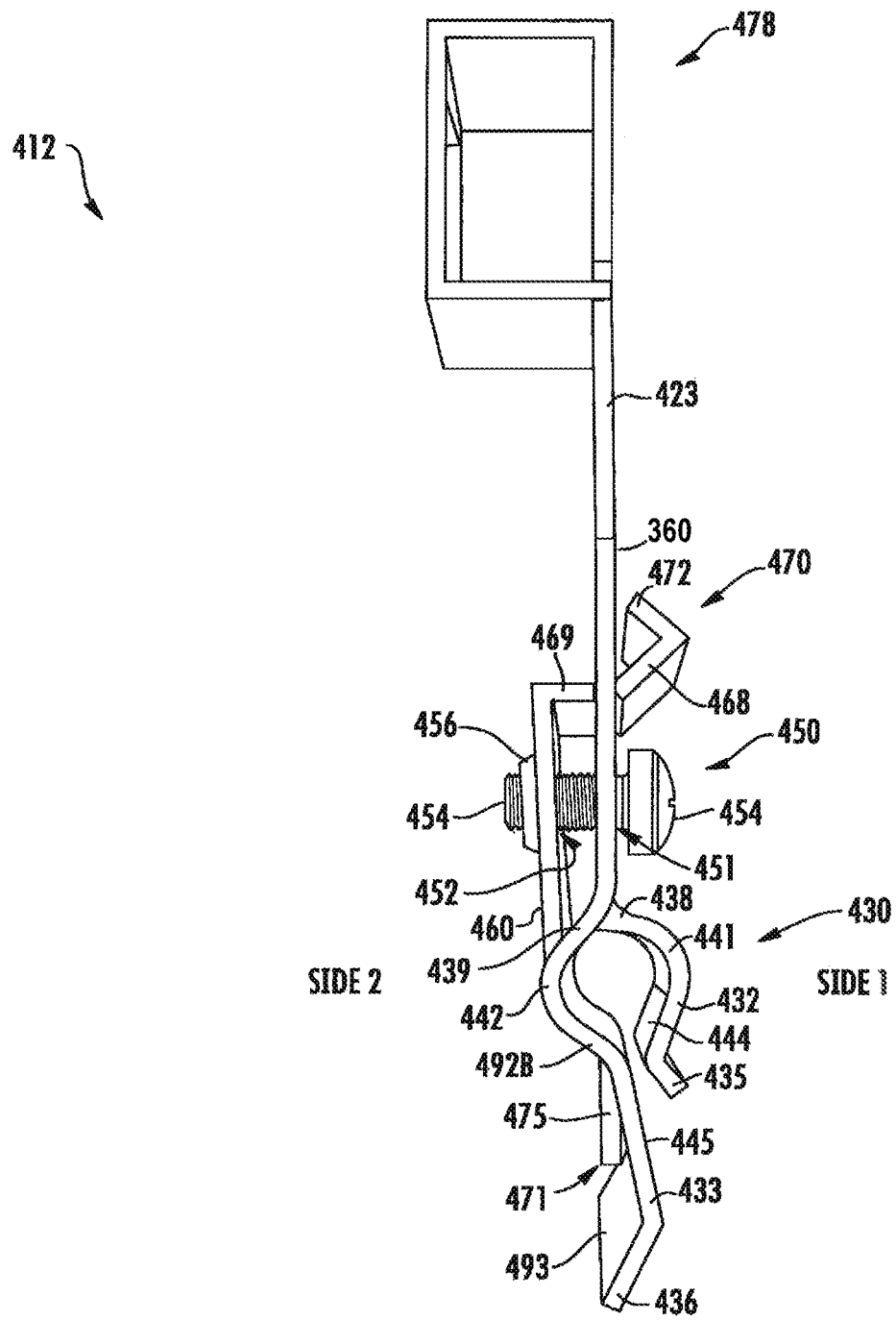
FIG. 12 is a side view of the fire sprinkler support assembly of FIG. 11 including a barrier layer according to exemplary approaches of the disclosure.
Figure 13:
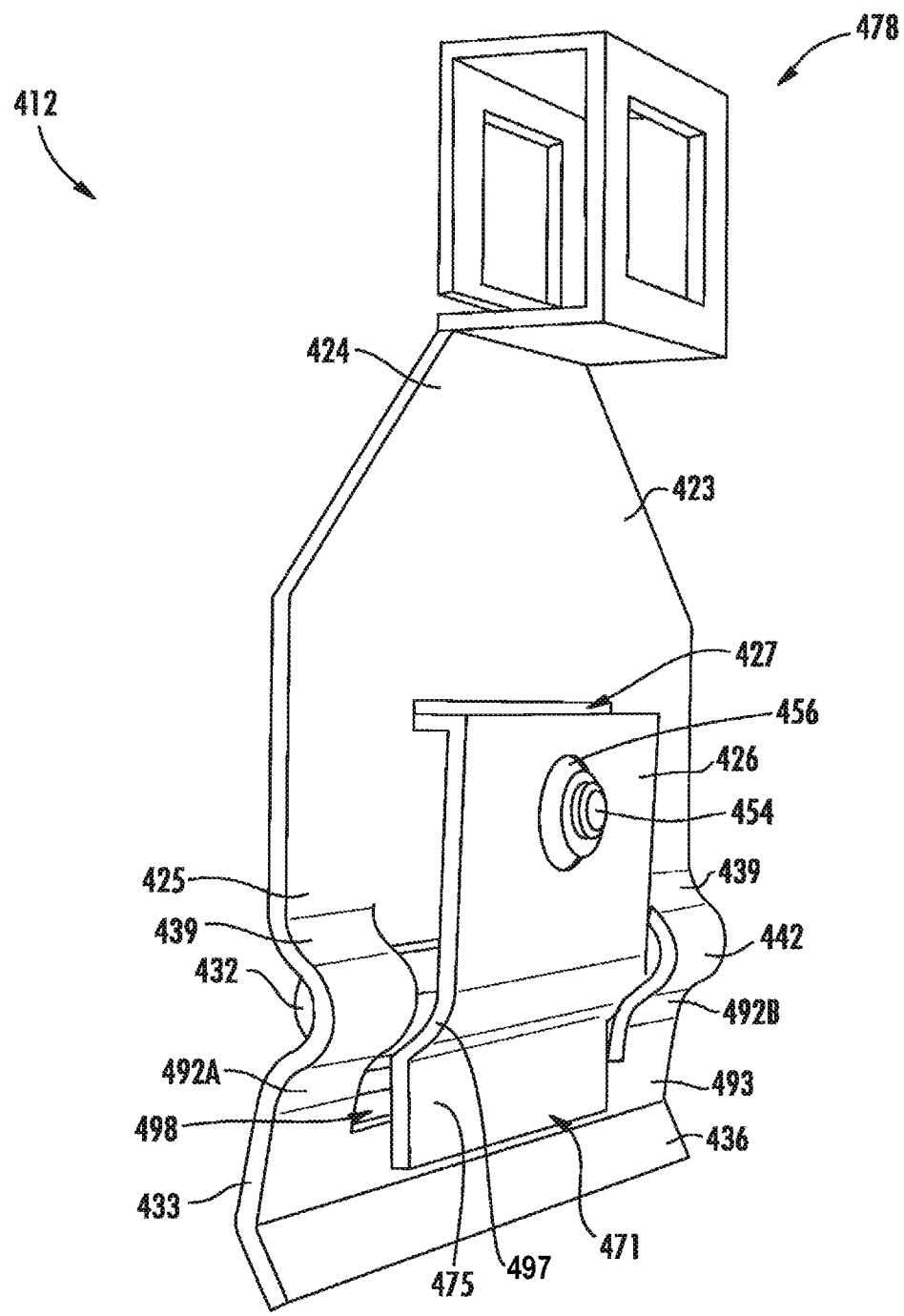
FIG. 13 is a perspective view of the fire sprinkler support assembly of FIG. 11 including a barrier layer according to exemplary approaches of the disclosure.
Figure 14:
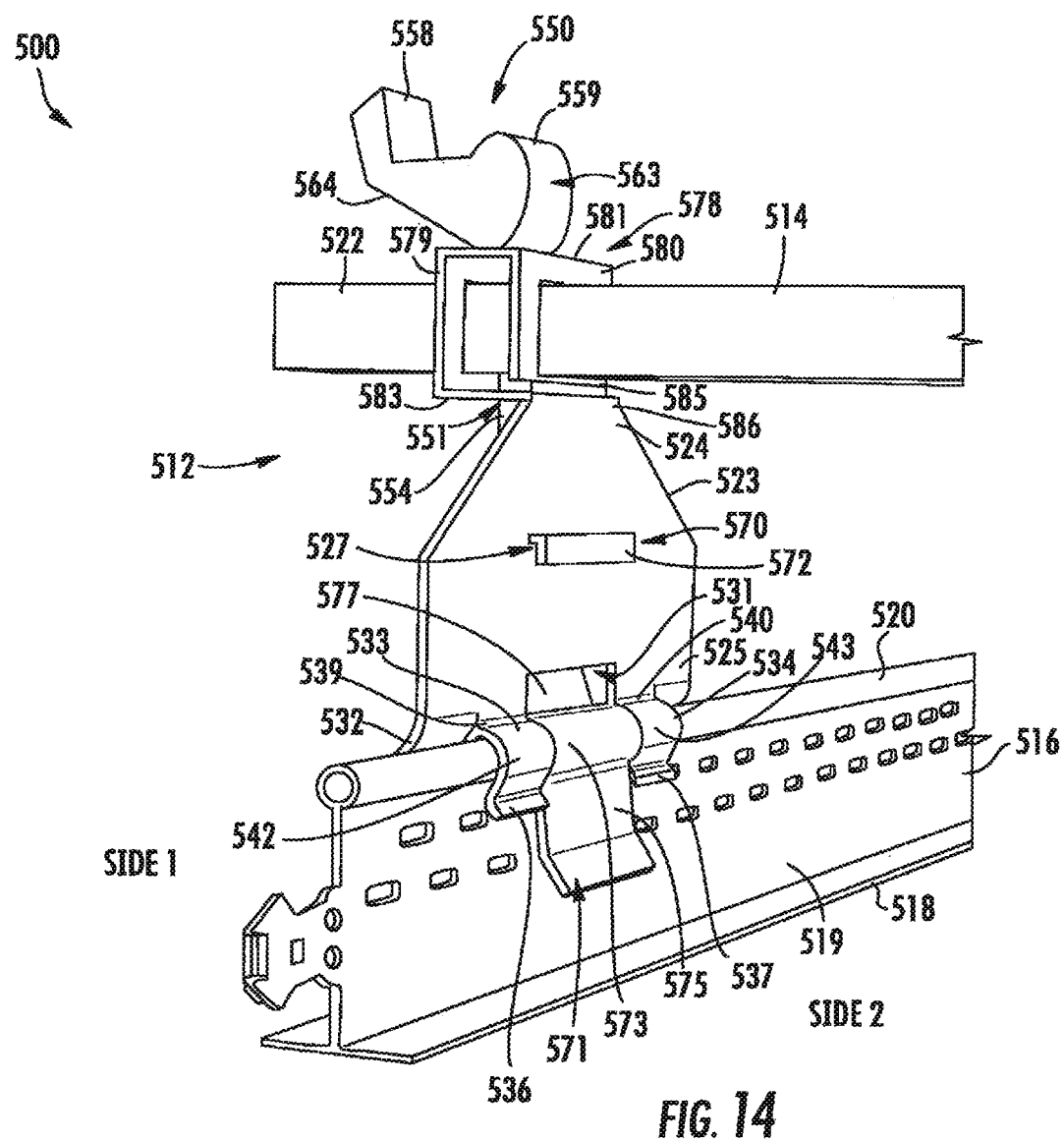
FIG. 14 is a perspective view of a fire sprinkler support assembly according to exemplary approaches of the disclosure.
Figure 15:
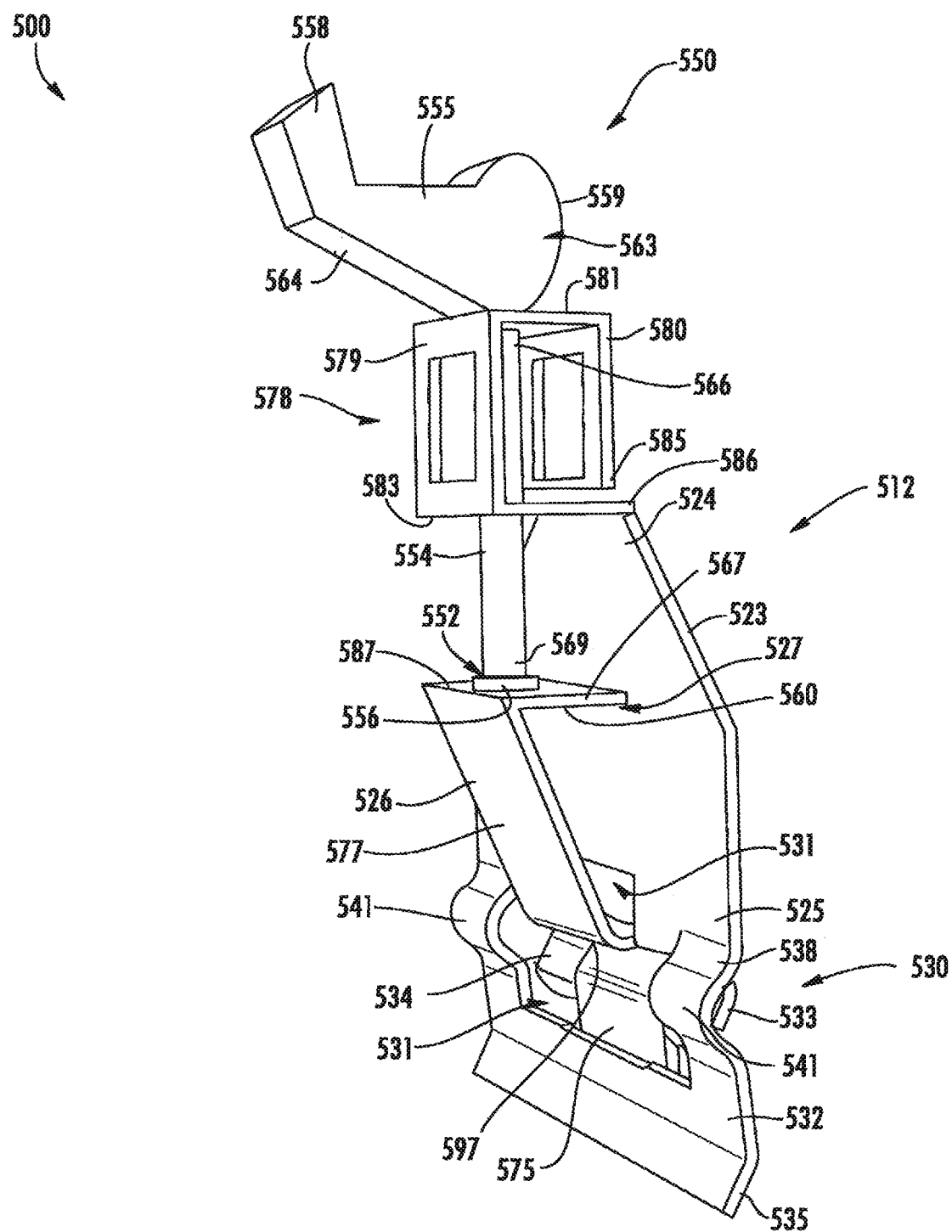
FIG. 15 is a perspective view of the fire sprinkler support assembly of FIG. 14 including a barrier layer according to exemplary approaches of the disclosure.

Turning now to FIGS. 11-13, a support assembly according to a first embodiment of the disclosure will be described in greater detail. As shown, the support assembly 400 includes a bracket bar 414 configured to extend transverse to a beam 416, which, as shown, may be a t-shaped beam including a flange 418, a web 419 expending perpendicularly from the flange 418, and a rim 420. A bracket assembly 412 may be coupled to one end 422 of the bracket bar 414. As shown, the bracket assembly 412 may include a first plate 423 oriented perpendicular, or substantially perpendicular, to the bracket bar 414, wherein the first plate 423 has a first end 424 coupled to the bracket bar 414, and a second end 425, opposite the first end 424, coupled to the beam 416. The bracket assembly 412 further includes a second plate 426 actionable relative to the first plate 423, wherein the second plate 426 extends through an opening or slot 427 in the first plate 423. As will be described in greater detail below, the second plate 426 may be biased relative to the first plate 423 to further secure the bracket assembly 412 to the beam 416.

To better retain the support assembly 400 in place, the bracket assembly 412 may include a seating frame 430 extending from the second end 425 of the first plate 423. As shown, the seating frame 430 may include a first member 432 and a second member 433 disposed on opposite sides of the beam 416 relative to one another such that the first member 432 and the second member 433 straddle the beam 416. In this embodiment, the second member 433 includes a pair of side members 492A-B, and a cross member 493 connecting the pair of side members 492A-B. The first and second members 432, 433 each include respective free ends 435 and 436, and respective attached ends 438 and 439. As shown, the attached ends 438, 439 may be integrally formed with, or coupled to, the second end 425 of the first plate 423. In exemplary embodiments, the attached ends 438, 439 include respective curved or bowed sections 441 and 442 extending outwardly away from the beam 416 so as to accommodate the rim 420 of the beam 416 therebetween. The free ends 435, 436 may also be curved or angled outwardly from the beam 416 to allow the rim of the beam 416 to be more easily received between the first and second members 432, 433 during installation. As configured, an inner surface 444 (FIG. 12) of the free end 435 of the first member 432 may engage the web 419 on side 1 of the beam 416, while an inner surface 445 of the second member 433 may engage the web 419 on side 2 of the beam 416.

As further shown, the bracket assembly 412 includes a fastener 450 coupling the first plate 423 with the second plate 426, wherein the fastener 450 extends through corresponding fastener openings 451, 452 in the first plate 423 and the second plate 426. In exemplary embodiments, the fastener 450 is a screw 454 oriented perpendicular, or generally perpendicular, to the first plate 423. The screw 454 may include a threaded exterior surface that engages a corresponding interior threaded surface of opening 451 and/or 452. The threads of the screw 454 may be further configured to engage a nut 456, which is positioned in abutment with an interior surface 460 of the second plate 426.

During installation, the first plate 423 is positioned atop the beam 416, causing the seating frame 430 to straddle the rim 420 and the web 419 of the beam 416, as described above. By rotating the threaded screw 454, the amount of space between the plates 423, 426 can be adjusted, thus causing the bracket assembly 412 to tighten or loosen about the beam 416. As shown, the head of the screw 454 may face outwards to allow easier access thereto by an installer.

In exemplary embodiments, the second plate 426 includes a first end 470 and a second end 471, wherein the first and second ends 470, 471 are located on opposite sides of the beam 416 when the seating frame 430 is in place. The first end 470 has a base section 469, which extends through the opening 427 of the first plate 423 and is oriented orthogonal to the first plate 423, a middle section 468, which extends from the first plate 423 at an upwards angle, and a tip end 472, which extends back towards the first plate 423. As configured, the tip end 472 may pivot or rotate to increase the distance between the tip end 472 and the interior surface 360 of the first plate 423 when the screw 454 is loosed, and to decrease the distance between the tip end 472 and the interior surface 360 of the first plate 423 when the screw 454 is tightened. It will be appreciated that the first end 470 is dimensioned with sufficient clearance relative to the opening 427 to allow for movement therebetween as the first and second plates 423, 426 changes position relative to one another.

As further shown, the second plate 426 extends from its connection point with the first plate 423, down along side 2 of the beam 416. At a first inflection point 497, the second plate 426 angles towards the beam 416 such that the second plate 426 extends into an opening 498 of the second member 433 formed by the pair of side members 492A-B and the cross member 493. As shown, the first inflection point 497 is shaped to accommodate the curvature of the rim 420. The second plate 426 may further include a flat lower section 475 having an inner surface configured to make physical contact with the web 419 of the beam 416. The flat lower section 475 of the second end 471 may extend downward, parallel to the first plate 423, or may curve outwardly away from the beam 416 to allow the rim of the beam 416 to pass more easily into the seating frame 430 during installation.

In exemplary embodiments, the bracket assembly 412 is coupled to the bracket bar 414 at the first end 424 of the first plate 423 by a hanger member 478. As shown, the hanger member 478 includes many or all of the features previously described in relation to the hanger member 378 of FIGS. 7-11 and, as such, will not be described in further detail for the sake of brevity.

Turning now to FIGS. 14-18, a support assembly according to another embodiment of the disclosure will be described in greater detail. As shown, the support assembly 500 includes a bracket bar 514 configured to extend transverse to a beam 516, which, as shown, may be a t-shaped beam including a flange 518, a web 519 expending perpendicularly from the flange 518, and a rim 520. A bracket assembly 512 is coupled at one end 522 of the bracket bar 514. As shown, the bracket assembly 512 may include a first plate 523 oriented perpendicular, or substantially perpendicular, to the bracket bar 514, wherein the first plate 523 has a first end 524 coupled to the bracket bar 514, and a second end 525 opposite the first end 524, coupled to the beam 516. The bracket assembly 512 further includes a second plate 526 rotatable relative to the first plate 523, wherein the second plate 526 has a first end 570 and a second end 571 disposed on a same side (e.g., side 2) of the beam 516. As shown, the first end 570 of the second plate 526 extends through a first opening or slot 527 in the first plate 523, while the second end 571 of the second plate 526 extends through a second opening 531 through the second end 525 of the first plate 523. As will be described in greater detail below, the second plate 526 may be biased relative to the first plate 523 to further secure the bracket assembly 512 to the beam 516 once the second end 525 of the first plate 523 is positioned atop the rim 520 of the beam 516.

To help retain the support assembly 500 in place, the bracket assembly 512 may further include a seating frame 530 extending from the second end 525 of the first plate 523. As shown, the seating frame 530 may include a first member 532 and a second member 533 disposed on opposite sides of the beam 516 (e.g., sides 1 and 2) relative to one another such that the first member 532 and the second member 533 straddle the beam 516. The seating frame 530 may further include a third member 534 extending from the second end 525 of the first plate 523, on the same side of the beam 516 as the second member 533. As shown, the second and third members 533, 534 are positioned on opposite sides of the second opening 531, which is formed through the first plate 523. The second end 571 of the second plate 526 may extend through the second opening 531 and between the second and third members 533, 534 of the seating frame 530.

In some embodiments, each of the first, second, and third members 532-534 include respective free ends 535, 536, and 537, and respective attached ends 538, 539, and 540. As shown, the attached ends 538-540 may be integrally formed with, or coupled to, the second end 525 of the first plate 523. In exemplary embodiments, the attached ends 538-340 include respective curved or bent sections 541, 542, and 543 generally shaped to accommodate the rim 520 of the beam 516 therebetween. The free ends 535-537 may be straight or may be curved/angled outwardly from the beam 516 to allow the rim of the beam 516 to be more easily received into the seating frame 530 during installation. In some embodiments, the free end 535 of the first member 532 extends between the bent sections 541 formed on opposite sides of the second opening 531.

As further shown, the bracket assembly 512 includes a fastener 550 coupling the first plate 523 with the second plate 526, wherein the fastener 550 extends through corresponding fastener openings 551, 552 in the first plate 523 and the second plate 526, respectively. In exemplary embodiments, the fastener 550 is a lever assembly including a rod 554 connected at a first end 566 to a lever 555 and at a second end 569 to the second plate 526, wherein the rod 554 is oriented parallel, or substantially parallel, to the first plate 523. The rod 554 may be a threaded bolt or stud, which passes through the corresponding fastener openings 551, 552 in respective first and second plates 523, 526. The threads of the rod 554 are configured to engage a nut 556, which is positioned in abutment with a lateral section 567 of the second plate 526. By rotating the threaded rod 554, the amount of space between the plates 523, 526 can be adjusted to make the bracket assembly 512 more or less secured with the beam 516.

The lever 555 is connected at the first end 566 of the rod 554, and includes a free end 558 and a cam surface 559. As shown, the cam surface 559 is engaged with the first plate 523, along a top wall 581 of a hanger member 578. The free end 558 of the lever 555 is actionable relative to the first plate 523 to reduce or increase tension between the first and second plates 523, 526. The lever 555 may be pivotally connected to the end of the rod 554 by a pin (not shown) and the rotational axis of the lever 555 is eccentric relative to the periphery of the cam surface 559. The cam surface 559 of the lever 555 has a generally semi-circular peripheral shape. When the bracket assembly 512 is assembled, the cam surface 559 abuts an outward-facing surface of the top wall 581 of the first plate 523. The lever 555 rotates about the pin between an open position and a closed position to increase or decrease the tension/distance between first and second plates 523, 526.

When the lever 555 is actuated, the cam surface 559 rotates about the eccentric rotational axis and creates a camming action against the first plate 523. The camming action is facilitated by the shape of the cam surface 559 including a first section 563, which is generally semi-circular, and a second section 564, which is generally flat. The flat shape of the second section 564 enables the lever 555 to be freely movable and adjustable when the bracket assembly 512 is in the open position. As the free end 558 of the lever 555 is rotated upwards and towards the supply pipe 104 (FIG. 1), the first section 563 pulls the rod 554 upward in a direction generally parallel to the first plate 523, as will be described in greater detail below.

In some embodiments, the rod 554 of the fastener 550 is directly coupled to the second plate 526, for example, at a lateral section 567 that is oriented perpendicular, or substantially perpendicular, to the first member 532. As shown, the lateral section 567 may extend through the first opening 527 of the first plate 523, where it connects with a tip end 572 of the second plate 526. The tip end 572 may extend downwards from the lateral section 567, along the first plate 523. During use, the lateral section 567 and the tip end 372 may slide and/or rotate within the first opening 527 to increase/decrease the distance between the tip end 572 and the first plate 523.

As shown, the second plate 526 further includes a middle section 577 extending from a connection point 587 with the lateral section 567 down along side 2 of the beam 516, at an angle towards from the beam 516. In some embodiments, the middle section 577 and the lateral section 567 form an acute angle at the connection point 587. At a first inflection point 597, the second plate 526 angles towards the beam 516, and then extends through the second opening 531 through the first plate 523. The second plate 526 may include a second inflection point 573 having an inner radius of curvature to accommodate and generally conform to the rim 520 of the beam 516, and a flat lower section 575 having an inner surface 576 configured to make physical contact with the web 519 of the beam 516. The second end 571 of the second plate 526 may extend downward and at an angle away from the beam 516, as shown, to allow the rim of the beam 516 to pass more easily into the seating frame 530 during engagement.

Figure 16:
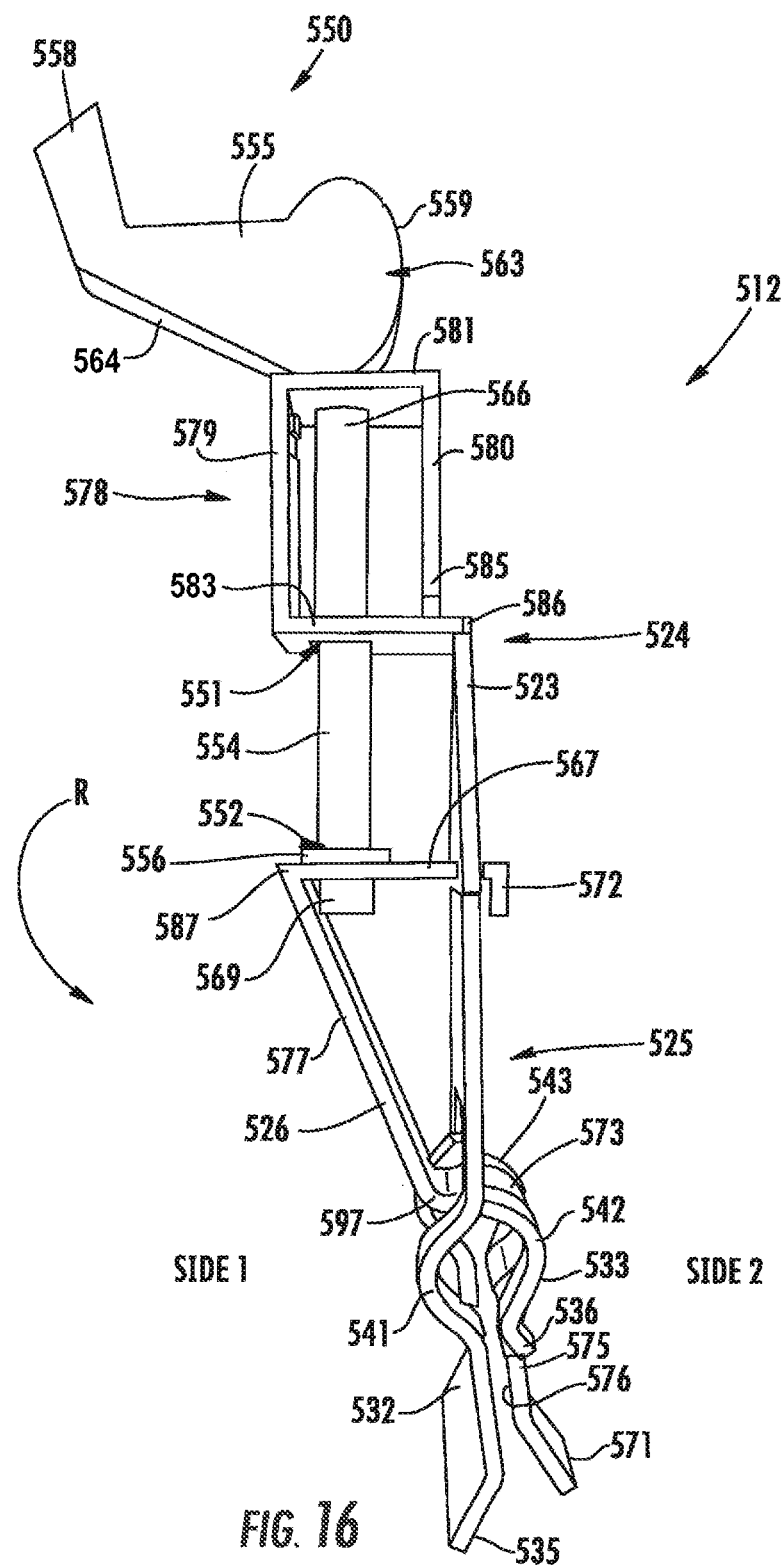
FIG. 16 is a side view of the fire sprinkler support assembly of FIG. 14 including a barrier layer according to exemplary approaches of the disclosure.
Figure 17:
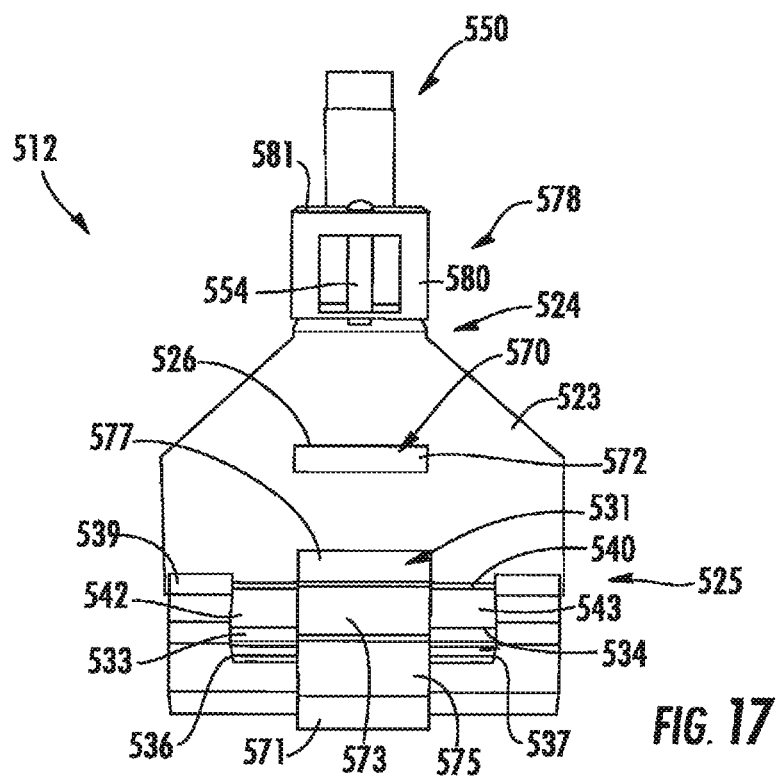
FIG. 17 is a rear view of the fire sprinkler support assembly of FIG. 14 including a barrier layer according to exemplary approaches of the disclosure.
Figure 18:
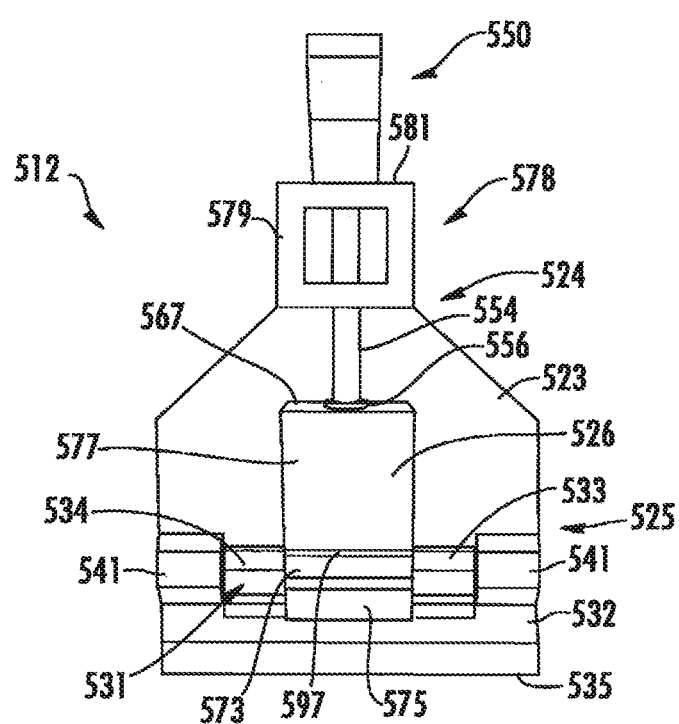
FIG. 18 is a front view of the fire sprinkler support assembly of FIG. 14 including a barrier layer according to exemplary approaches of the disclosure.

As best shown in FIG. 16, during use, rotation of the free end 558 of the lever 555 upwards causes the rod 554 to move downward in a direction generally parallel to the first plate 523, which transfers a downward force to the lateral section 567. In some embodiments, the rod 554 is offset relative to a center 560 of the lateral section 567, which causes the second plate 526 to begin to rotate relative to the first plate 523, as shown by arrow 'R.' As the second plate 526 rotates, the connection point 587 moves laterally away from the beam 516, causing the tip end 572 to move towards and engage the first member 532, which brings the second end 525 closer to the second plate 526, thus tighten the seating frame 530 about the beam 516.

Referring again to FIGS. 14-18, in exemplary embodiments, the bracket assembly 512 is coupled to the bracket bar 514 at the first end 524 of the first plate 523 by the hanger member 578. As shown, the hanger member 578 includes a pair of parallel, or substantially parallel, walls 579, 580 connected by a top wall 581. A bottom wall 583 of the hanger member 578 connects the side wall 580 to the first end 524 of the first plate 523. The parallel walls 579, 580 may be oriented transverse to the bracket bar 514, and parallel, or substantially parallel, to the remainder of the first plate 523. In exemplary embodiments, the bracket bar 514 extends through openings in each of the first and second parallel walls 579, 580, and is secured in place by the rod 554 of the fastener 550. As shown, the rod 554 extends through the top wall 581 and the bottom wall 583, as well as through an opening (not shown) formed through the beam 516.

The hanger member 578 may include a free end 585 and a secured end 586, which is integrally formed with or attached to first end 524 of the first plate 523. In other embodiments, the free end 585 may be integrally formed or coupled to the first end 524 of the first plate 523 so that no gap is present therebetween. As shown, the hanger member 578 has a rectangular, or substantially rectangular, shape.

For each of the herein described embodiments, a non-limiting method of mounting the support assembly to a ceiling support structure (e.g., a beam) will now be described. First, a person installing the fire support assembly actuates the fastener coupling the first and second plates together to an open position, which loosens the first and/or second plates relative to one another. Next, with the seating frame of the bracket assembly in the open position, the bracket assembly of the support assembly is fitted onto the corresponding beam(s). Fitting the bracket assembly onto the beam may include manually spreading the first and second plates by rotating the second plate relative to the first plate to obtain adequate spacing to accept the rim and the flange of the beam. Next, when the support assembly is in the desired location about beam, the spacing between the plates may be adjusted (e.g., narrowed) by actuation (e.g., rotation) of the fastener to a closed position. To remove the support assembly, the fastener may again be actuated to an open position, and the bracket assembly may be lifted from the beam.

It will be appreciated that embodiments of the disclosure provide at least the following advantages. Firstly, some embodiments of the disclosure only require a user to push a lever that will tighten and anchor the seating frame onto the T-bar beam of the ceiling grid system, thereby allowing users to first install the bracket assembly, followed by the ceiling tile, due to the high clearance afforded by the bracket assembly design. Secondly, the configuration of the seating frame allows the bracket assembly to "snap" to the beam, thus allowing the bracket to be installed faster, and potentially by hand, thus reducing tooling such as cordless drills and drivers. Thirdly, the brackets are designed to hold a sprinkler head firmly in place during operation by resisting side, rotational, and torsional forces, thus satisfying UL requirements for use in the fire protection industry.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

That which is claimed is:

1. A bracket assembly comprising:
a first plate having a first end and a second end, the first plate defining a first plate opening and a first fastener opening;
a seating frame extending from the second end of the first plate, the seating frame defining a first member positionable on a first side of a beam and a second member positionable on a second side of the beam, wherein each of the first member and the second member defines a curved section adjacent to the second end of the first plate, wherein the curved section of each of the first member and the second member is configured to extend convexly outwardly away from the beam, and wherein the curved sections are configured to receive a rim of the beam therebetween;
a second plate actionable relative to the first plate and defining a second fastener opening, the second plate extending through the first plate opening in the first plate, the second plate defining a lower section positionable on the second side of the beam; and
a fastener coupling the first plate to the second plate, wherein the fastener is a screw defining a threaded exterior surface, the screw configured to engage the first fastener opening and the second fastener opening;
wherein the first member defines a first free end and the second member defines a second free end, and wherein each of the first free end and the second free end is tilted to be angled outwardly away from the beam for facilitating insertion of the rim of the beam between the first member and the second member.

2. The bracket assembly of claim 1, wherein the screw is oriented substantially perpendicular to the first plate.

3. The bracket assembly of claim 1, wherein the threaded exterior surface of the screw is configured to engage at least one selected from the group of an interior threaded surface of the first fastener opening and an interior threaded surface of the second fastener opening.

4. The bracket assembly of claim 1, wherein:
the bracket assembly further comprises a nut;
the threaded exterior surface of the screw engages the nut; and
the nut is positioned to abut a surface of the second plate.

5. The bracket assembly of claim 1, wherein the screw is rotatable to adjust an amount of space between the first plate and the second plate.

6. The bracket assembly of claim 1, wherein:
the second plate defines a first end and a second end;
the first end of the second plate defines a tip end extending towards the first plate.

7. The bracket assembly of claim 6, wherein the tip end is configured to pivot away from the first plate when the screw is loosened and to pivot towards the first plate when the screw is tightened.

8. The bracket assembly of claim 1, each of the first member and wherein the curved section of the first member is defined by an attached end of the first member, wherein the curved section of the second member is defined by an attached end of the second member, and wherein the attached end of each of the first member and the second member is coupled to the second end of the first plate.

9. The bracket assembly of claim 8, wherein the second member comprises a pair of side members and a cross member connecting the pair of side members.

* * * * *